(12) United States Patent  (10) Patent No.: US 7,671,754 B2
Heilmann et al.  (45) Date of Patent: Mar. 2, 2010

(54) SENSOR FOR DETECTING LEAKAGE OF A LIQUID

(75) Inventors: Albert R. Heilmann, West Warwick, RI (US); Jonathan Sauerbrery, Coventry, RI (US); Christopher A. VanHaaren, Warwick, RI (US)

(73) Assignee: Amtrol Licensing Inc., West Warwick, RI (US)

( * ) Notice: Subject to any disclaimer, the term of this patent is extended or adjusted under 35 U.S.C. 154(b) by 291 days.

(21) Appl. No.: 11/948,493

(22) Filed: Nov. 30, 2007

(65) Prior Publication Data

US 2009/0140866 A1 Jun. 4, 2009

(51) Int. Cl.
*G08B 21/00* (2006.01)
(52) U.S. Cl. .................. 340/620; 340/605; 340/618; 200/61.04; 73/304 R
(58) Field of Classification Search ............... 340/620, 340/65, 604, 603, 618, 612; 200/61.04, 61.05; 73/304 R, 40
See application file for complete search history.

(56) References Cited

U.S. PATENT DOCUMENTS

| | | | |
|---|---|---|---|
| 4,728,924 A * | 3/1988 | Franklin | .............. 73/290 R |
| 5,000,224 A | 3/1991 | Olson, Jr. et al. | |
| 5,058,421 A | 10/1991 | Alexander et al. | |
| 5,091,715 A * | 2/1992 | Murphy | ............. 340/604 |
| 6,035,699 A | 3/2000 | Parlante | |
| 6,272,903 B1 * | 8/2001 | Shafer | ................. 73/46 |
| 7,084,776 B2 | 8/2006 | Tacilauskas | |
| 7,084,777 B2 | 8/2006 | Ninberg | |
| 2008/0252447 A1 * | 10/2008 | Atherton et al. | ........ 340/540 |

OTHER PUBLICATIONS

Website pages from DynaQuip Controls—WaterCop Components, www.watercop.com/wc-components.asp, accessed Nov. 21, 2007; (4 pages).
Website pages from Basement Watchdog Water Alarm; "Watching out for youl," www.basementwatchdog.com/water_alarm.html, accessed Nov. 21, 2007; (2 pages).

* cited by examiner

*Primary Examiner*—George A Bugg
*Assistant Examiner*—Hongmin Fan
(74) *Attorney, Agent, or Firm*—Edwards Engell Palmer & Dodge LLP

(57) ABSTRACT

A sensor for detecting the presence of a liquid. The sensor includes a housing having a concave upper surface, a concave lower surface, and a peripheral wall connecting the upper surface and the lower surface, the wall extending above the upper surface and below the lower surface. A plurality of apertures are formed in the wall. A plurality of electrically conductive members extend above the upper surface and below the lower surface and are separated from one another by a gap in which a liquid can accumulate. The electrically conductive members are configured to generate an output signal when a conductive liquid comes into contact with the electrically conductive members and bridges the gap. An output connector is coupled to the plurality of electrically conductive members and is configured to carry the output signal.

20 Claims, 5 Drawing Sheets

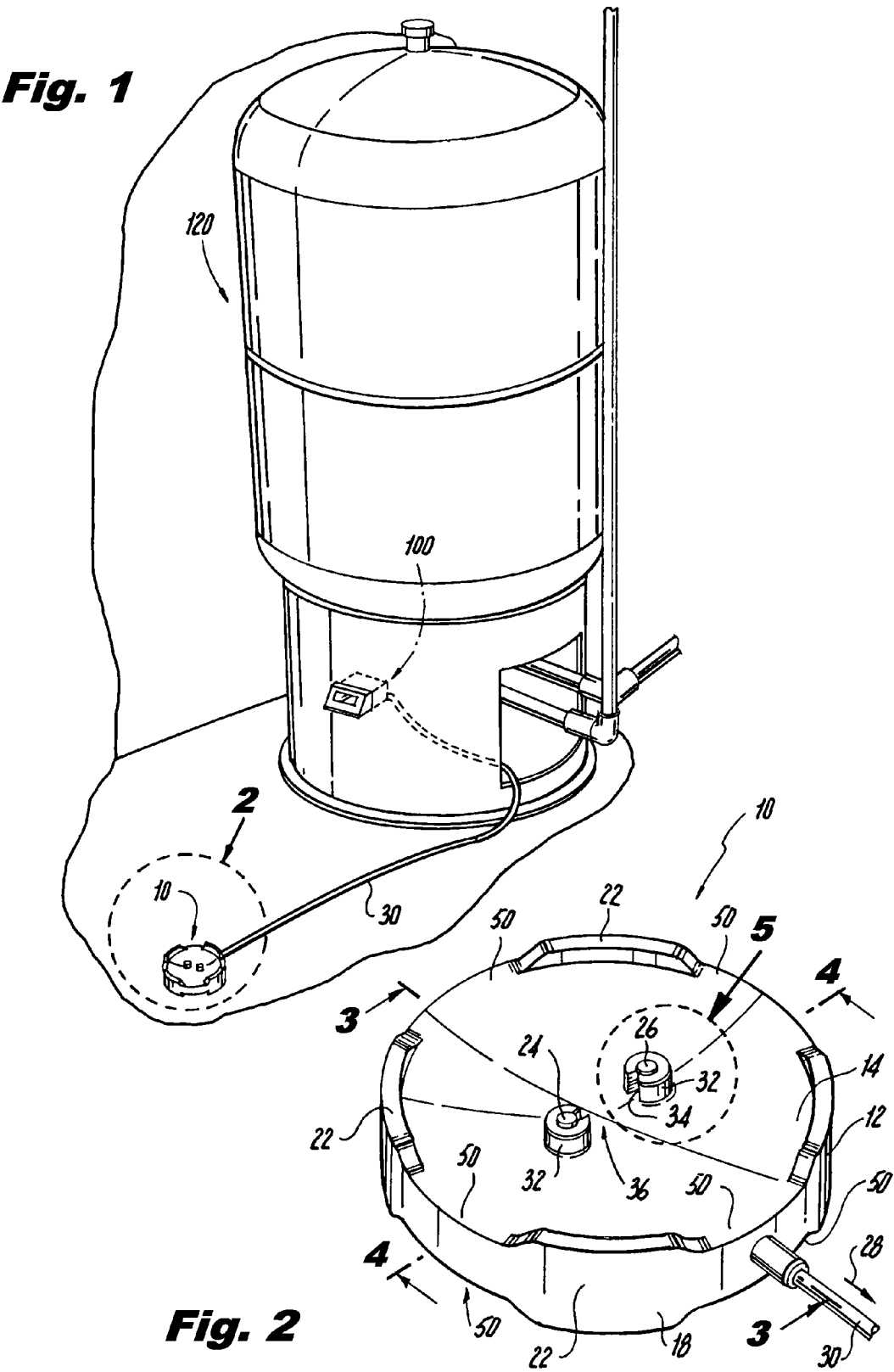

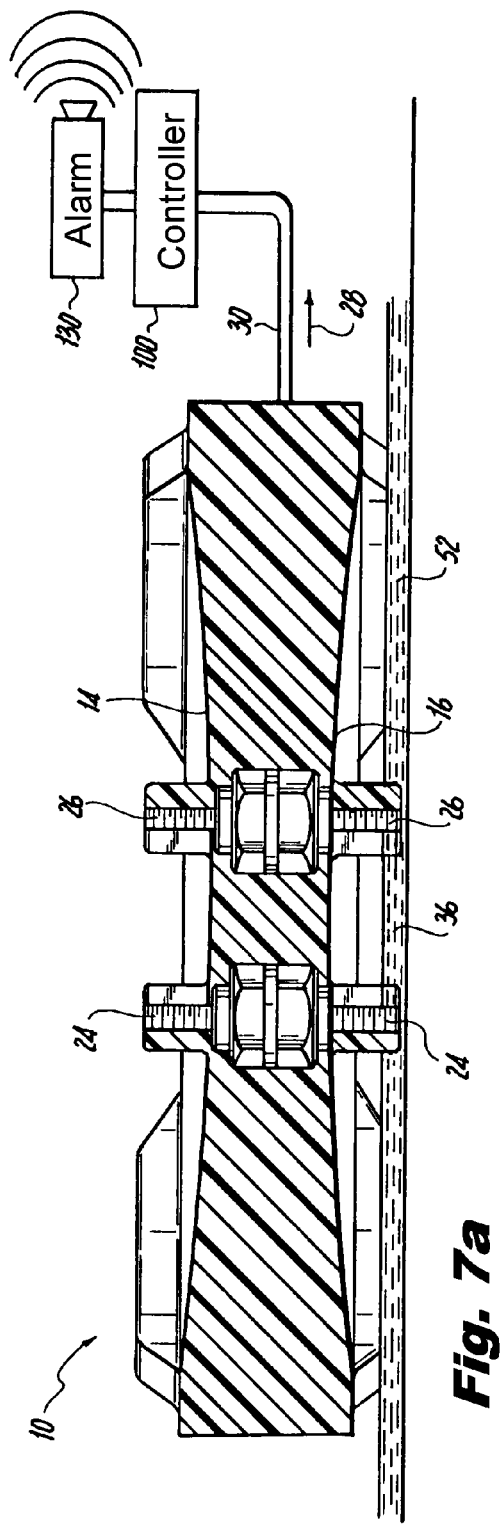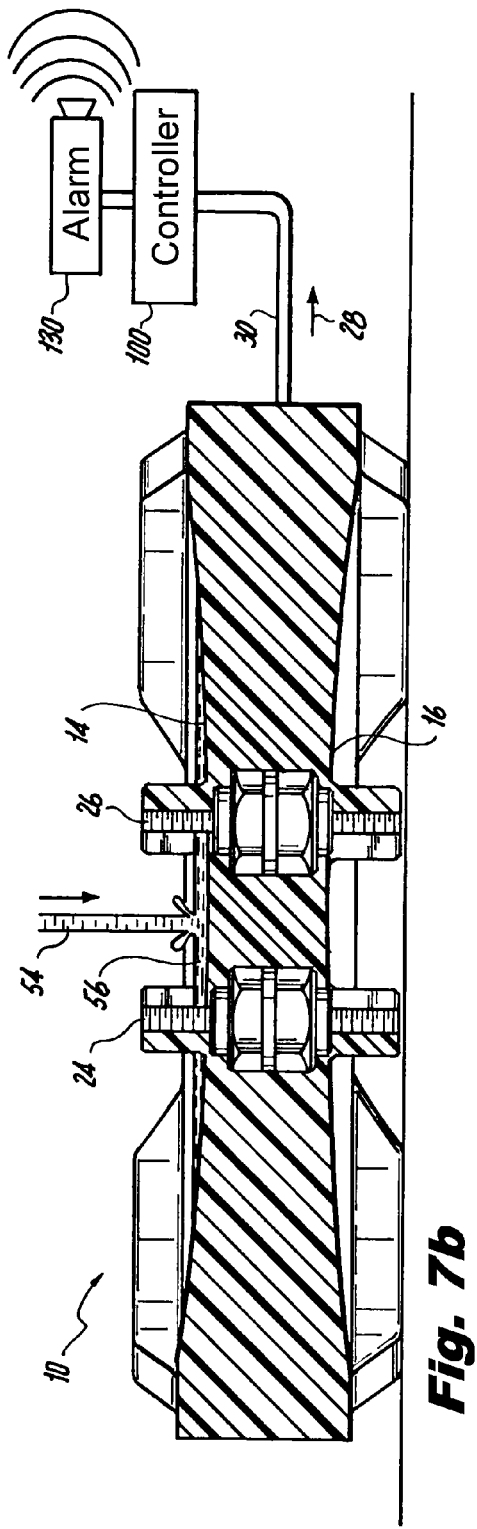

SENSOR FOR DETECTING LEAKAGE OF A LIQUID

BACKGROUND OF THE INVENTION

1. Field of the Invention

The present invention relates to a device and system for detecting leakage of a liquid. Particularly, the present invention is directed to a low-cost, portable water sensor that can be positioned on the floor to detect water leaking from a water tank, appliance, or plumbing fixture, and to detect water that has accumulated on the floor.

2. Description of Related Art

A variety of leak detection devices, including electrical and mechanical devices, are known in the art. Such devices are often used to detect leakage of water or other fluids from water tanks, appliances, sinks, plumbing fixtures, and the like so that leaks can be identified and corrected before flooding and substantial property damage occurs. Conventional leak-detection devices include conductive members integrated into flooring materials, as well as portable systems incorporating various electronic devices. Such conventional devices generally have been considered satisfactory for their intended purpose. However, these devices are not able to detect the presence of a liquid both above and below the device. There remains a need in the art for a simple, inexpensive, and portable leak sensor that can detect leaks on a floor as well as leaks from appliances under which the sensor is placed. The present invention provides a solution for these problems.

SUMMARY OF THE INVENTION

Advantages of the present invention will be set forth in and become apparent from the description that follows. Additional advantages of the invention will be realized and attained by the devices and systems particularly pointed out in the written description and claims, as well as from the appended drawings.

To achieve these and other advantages and in accordance with the purpose of the invention, as embodied herein, the invention includes a sensor for detecting the presence of a liquid. The sensor includes a housing having a concave upper surface, a concave lower surface, and a peripheral wall connecting the upper surface and the lower surface, the wall extending above the upper surface and below the lower surface. A plurality of apertures are formed in the wall. A plurality of electrically conductive members extend above the upper surface and below the lower surface and are separated from one another by a gap in which a liquid can accumulate. The electrically conductive members are configured to generate an output signal when a conductive liquid comes into contact with the electrically conductive members and bridges the gap. An output connector is coupled to the plurality of electrically conductive members and is configured to carry the output signal.

In accordance with a further aspect of the invention, a further embodiment of a sensor for detecting the presence of a liquid is provided. The sensor includes a housing having a concave upper surface and a concave lower surface surrounded by a cylindrical wall, the upper surface, lower surface, and cylindrical wall forming a hollow portion within the housing, the cylindrical wall including a plurality of apertures. A first conductive pin and a second conductive pin extend through the hollow portion of the housing and protrude above the concave upper surface and below the concave lower surface, the first and second conductive pins being separated from one another by a gap in which a liquid can accumulate. The first and second conductive pins are configured to generate an output signal when a conductive liquid comes into contact with both the first and the second conductive pins and bridges the gap. The sensor also includes an output connector coupled to the first and second conductive pins and configured to carry the output signal.

A system for detecting the presence of a conductive liquid is also provided. The system includes a sensor having a housing with a concave upper surface, a concave lower surface, a peripheral wall connecting the upper surface and the lower surface, the wall extending above the upper surface and below the lower surface, and a plurality of apertures formed in the wall. The sensor of the system also includes a plurality of electrically conductive members extending above the upper surface and below the lower surface and separated from one another by a gap in which a liquid can accumulate. The electrically conductive members are configured to generate an output signal when a conductive liquid comes into contact with, and bridges the gap between, the plurality of electrically conductive members. The system also includes an output connector, coupled to the plurality of electrically conductive members and configured to carry the output signal, a control system interfacing with the output connector and receiving the output signal, and an alarm system activated by the control system in response to the output signal.

The foregoing general description and the following detailed description are exemplary and are intended to provide further explanation of the invention claimed. The accompanying drawings, which are incorporated in and constitute part of this specification, are included to illustrate and provide further understanding of the method and system of the invention. Together with the description, the drawings serve to explain principles of the invention.

BRIEF DESCRIPTION OF THE DRAWINGS

FIG. 1 is a perspective view showing an exemplary embodiment of a sensor in accordance with the present invention, the sensor being shown wired to a control panel of a water heater.

FIG. 2 is an enlarged top perspective view of the sensor shown in FIG. 1.

FIG. 7*a* is a cross-sectional view of an exemplary embodiment of a sensor in accordance with the present invention, showing the presence of a conductive liquid below the sensor.

FIG. 7*b* is a cross-sectional view of an exemplary embodiment of a sensor in accordance with the present invention, showing the presence of a conductive liquid on a top surface of the sensor.

DETAILED DESCRIPTION OF THE PREFERRED EMBODIMENTS

Figure 3:
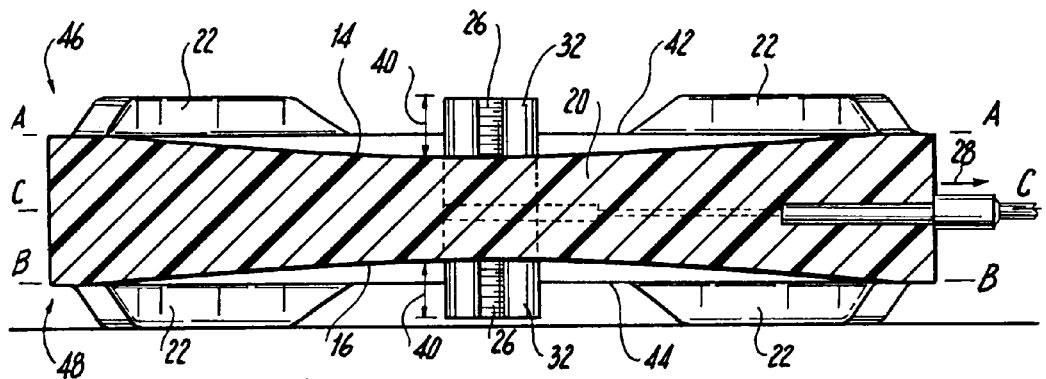
FIG. 3 is a cross-sectional view taken along line 3-3 of FIG. 2.
Figure 4:
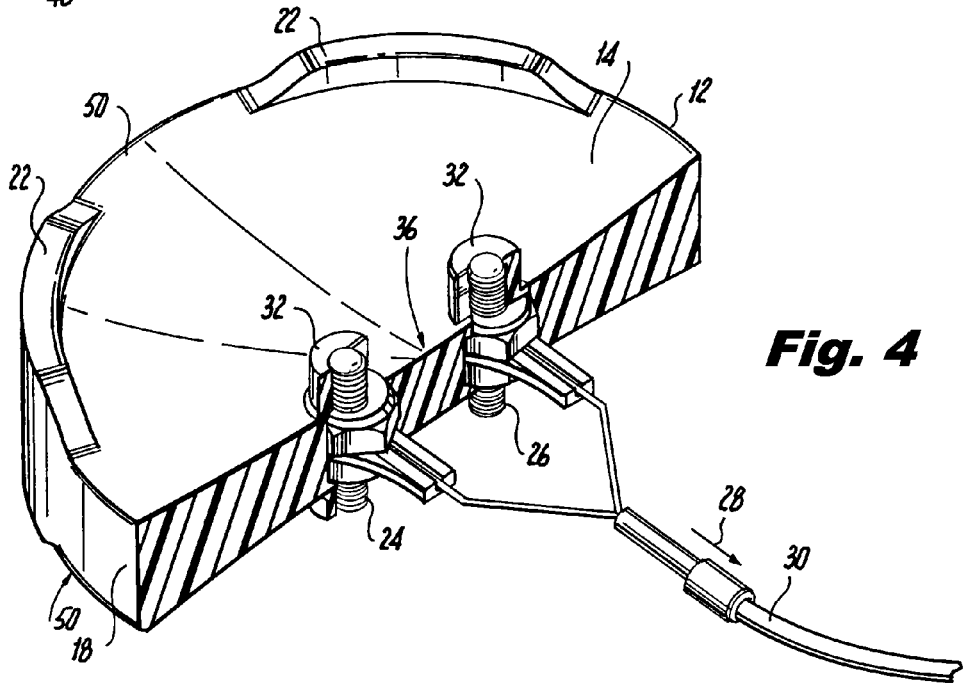
FIG. 4 is a perspective cross-sectional view taken along line 4-4 of FIG. 2.

Reference will now be made in detail to the present preferred embodiments of the invention, examples of which are illustrated in the accompanying drawings.

The devices and systems described in this disclosure may be used for detecting the presence of a conductive liquid. The present invention is particularly suited for detecting water leaks under water storage devices, appliances, and plumbing fixtures.

For purpose of explanation and illustration, and not limitation, a perspective view of an exemplary embodiment of a sensor in accordance with the invention is shown in FIGS. 1 and 2 and is designated generally by reference character 10. Other embodiments of the sensor and systems using the sensor in accordance with the invention, or aspects thereof, are provided in FIGS. 3 through 9, as will be described.

FIG. 1 illustrates an exemplary use of sensor 10. In the exemplary embodiment shown, sensor 10 interfaces with a controller 100. Controller 100 controls a hot water heating system, which may include, among other things, a water heater 120. In one exemplary embodiment, water heater 120 is a Boilermate™ indirect-fired domestic water heater available from the Amtrol Corporation of West Warkwick, R.I., USA. Sensor 10 is placed on the floor near water heater 120 to detect possible leakage from water heater 120. As will be described in detail below, when sensor 10 detects the presence of a liquid, a signal is sent to controller 100, which in turn activates an alarm, notifying a homeowner of a potential leak near water heater 120. Although FIG. 1 illustrates sensor 10 on a floor near water heater 120, the present disclosure also contemplates placing sensor 10 beneath water heater 120. Sensor 10 can also be placed beneath or adjacent to a washing machine, a sink, a plumbing line, or in any other leak-prone area. Sensor 10 is particularly useful in areas where flooding may go undetected, such as basements.

As shown in FIG. 2 through 5, Sensor 10 includes a housing 12. Housing 12 can be made from a variety of materials, including a thermoplastic elastomer (TPE) or rubber. In one exemplary embodiment, housing 12 is made of an injection molded, non-conductive plastic material. Housing 12 includes a concave upper surface 14, a concave lower surface 16, and a cylindrical wall 18. Cylindrical wall 18 is a peripheral wall surrounding concave upper surface 14 and concave lower surface 16 to form a central portion 20. In one exemplary embodiment, central portion 20 is at least partially hollow. A plurality of supports 22 extend upward from cylindrical wall 18 and above concave upper surface 14. A plurality of supports 22 also extend downward from cylindrical wall 18 and below concave lower surface 16. Supports 22 may be integrally formed with wall 18.

A plurality of electrically conductive members protrude above concave upper surface 14, extend through central portion 20 of housing 12, and protrude below concave lower surface 16. The conductive members are configured to generate an output signal when a liquid is present between the conductive members. In one exemplary embodiment, the conductive members comprise a first conductive pin 24 and a second conductive pin 26. When a conductive liquid comes into contact with, and bridges the gap between conductive pins 24 and 26, an extra low voltage circuit is completed, which sends an electrical output signal 28 to an output connector 30 coupled to conductive members 24, 26. In one exemplary embodiment, conductive members 24, 26 are positioned near the center of upper surface 14 and lower surface 16. More particularly, conductive members 24, 26 may be positioned equidistant from a line passing through the deepest point of the concave upper surface 14 and the deepest point of the concave lower surface 16. The output connector interfaces with controller 100 and can be any suitable electrical connecting device. In one exemplary embodiment, output connector 30 includes a crimp-on terminal that interfaces with conductive member 24, a crimp-on terminal that interfaces with conductive member 26, a multi-conductor cable, and a receptacle that mates with a printed circuit board header assembly located within controller 100.

Figure 5:
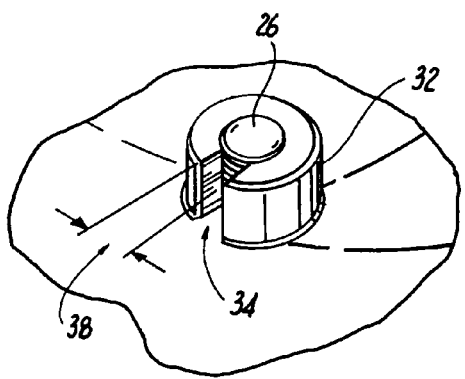
FIG. 5 is an enlarged top perspective view of one of the protective coverings shown in FIG. 2.

Sensor 10 may also include non-conductive protectors 32 surrounding each conductive pin 24, 26 on both the upper concave surface 14 and the lower concave surface 16. FIG. 5 is an enlarged view of a portion of FIG. 1 showing conductive pin 26 and protector 32 in greater detail. In the exemplary embodiment shown, protectors 32 are C-shaped, that is, substantially cylindrical with a cut-out portion 34. As shown in FIG. 1, the cut-out portions 34 of the respective protectors 32 face each other, so that a circuit will be completed when a conductive liquid bridges a gap 36 between conductive pins 24 and 26. In the exemplary embodiment shown, a top portion of conductive pins 24 and 26 is not covered by protectors 32.

The relative dimensions of conductive pins 24, 26 and protectors 32 can be adjusted to change the sensitivity of sensor 10. For example, the width 38 of cut out portions 34 can be increased or decreased. Additionally, the height 40 that conductive pins extend above concave upper surface 14 and below concave lower surface 16 can be adjusted. Adjusting height 40 of conductive pins 24, 26 will increase or decrease the depth of liquid necessary to bridge gap 36 and thus send signal 28 to controller 100.

In one exemplary embodiment, housing 12 of sensor 10 is substantially symmetrical about a horizontal plane. In particular, as shown in FIG. 3, housing 12 is symmetrical about a plane C that is equidistant from a first plane A defined by a perimeter rim 42 of upper concave surface 14 and a second plane B defined by a perimeter rim 44 of lower concave surface 16. Plane A and plane B are parallel to one another. Upper concave surface 14 and lower concave surface 16 have substantially similar structures; an upper portion 46 of housing 12, located above plane C, is substantially a mirror image of a lower portion 48 of housing 12, located below plane C.

Sensor 10 can thus be used with either the concave upper surface 14 or the concave lower surface 16 facing upward. For example, sensor 10 may be placed on a planar surface such as a floor, with upper concave surface 14 facing away from the floor, as shown in FIG. 1. This allows a conductive liquid to flow through apertures 50 formed in wall 18. In the exemplary embodiment shown FIGS. 1 through 4, apertures 50 are spaced radially around the perimeter of cylindrical housing 12 in a symmetric manner, allowing a conductive liquid to flow through apertures 50 on all sides of sensor 10. Similarly, sensor 10 may also be used with concave lower surface 16 facing upward, as shown in FIG. 3. Because upper portion 46 and lower portion 48 of housing 12 are mirror images, sensor 10 functions in the same way, regardless of whether upper concave surface 14 or lower concave surface 16 is facing upward.

Figure 6:
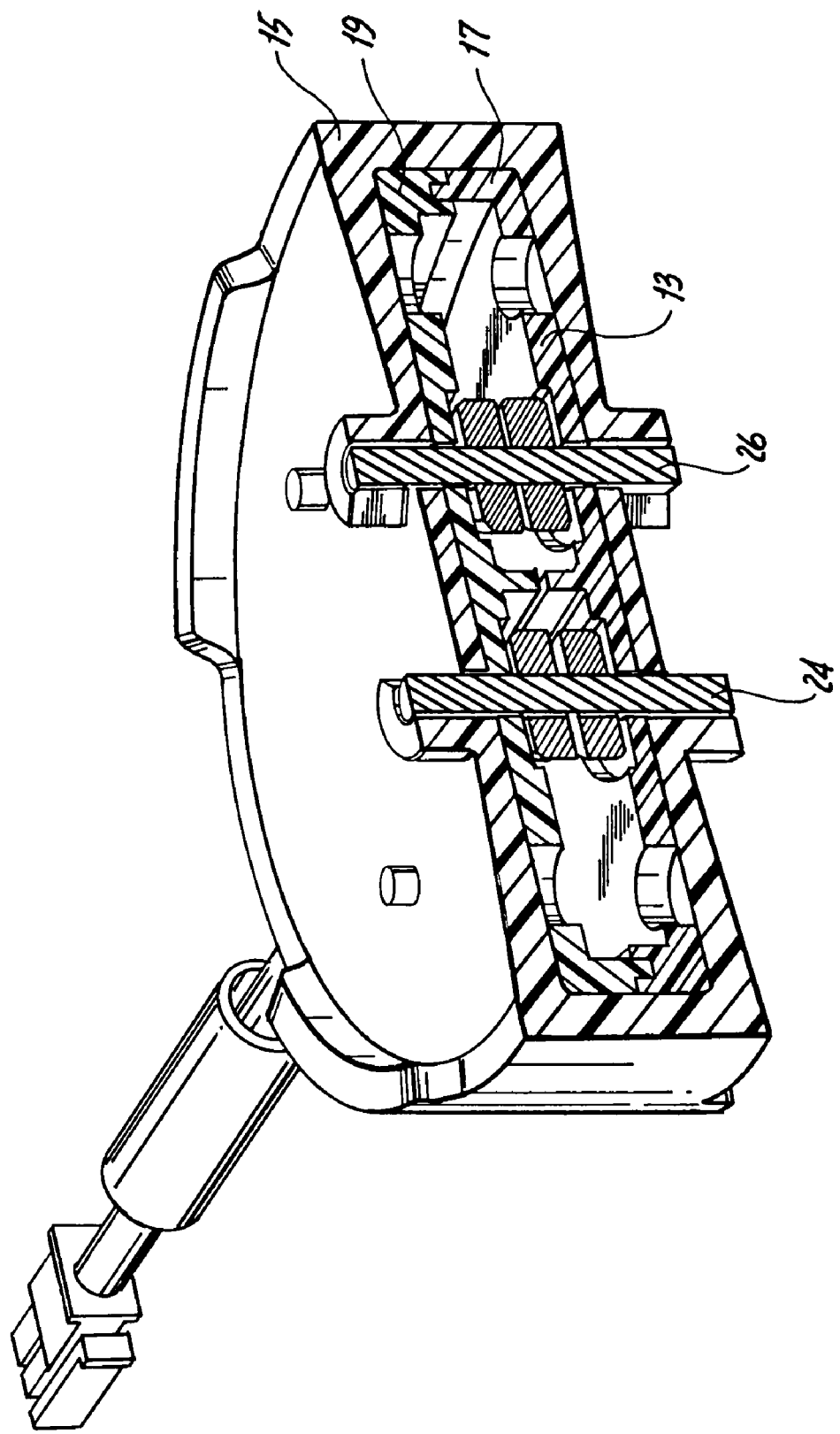
FIG. 6 is a perspective cross-sectional view of another embodiment of a sensor in accordance with the present invention.

Another exemplary embodiment of sensor 10 is shown in FIG. 6. In this embodiment, housing 12 of sensor 10 includes an internal shell 13 surrounded by an overmold 15. Internal shell 13 may be made of plastic or any other suitably rigid material. In one exemplary embodiment, internal shell comprises a lower portion 17 and an upper portion 19 that can be press fit or otherwise joined together to form internal shell 13. Internal shell 13 is substantially hollow and may include interior structures within the shell for holding conductive pins 24, 26 in place. In one exemplary embodiment, conductive pins 24, 26 have a threaded exterior surface and are held in place by a plurality of hardware elements 21, such as nuts, bolts, and/or washers that are secured to the threaded exterior surface. The hardware elements 21 also serve to secure a wire to conductive pins 24, 26 such that the conductive pins are connected to output connector 30 via the wire. Interior portions of internal shell 13 may include structures for securely holding the hardware elements 21 and/or the conductive pins 24, 26.

In one exemplary embodiment, internal shell 13 is made of a glass-filled polycarbonate material and overmold 15 is made of a thermoplastic elastomer (TPE). The use of internal shell 13 allows for greater ease of assembly when manufacturing sensor 10, because internal shell 13 holds conductive pins 24, 26 in place while overmold 15 is applied. In one exemplary embodiment, overmold 15 is injection molded around internal shell 13.

FIGS. 7a and 7b illustrate the operation of sensor 10. When sensor 10 is positioned on the floor with the concave upper surface 14 facing away from the floor, the presence of conductive members 24, 26 both above the upper surface 14 and below the lower surface 16 allows sensor 10 to detect the presence of a liquid on either the upper surface 14 or on the floor. Because sensor 10 includes conductive members on both upper surface 14 and lower surface 16, sensor 10 can detect both a leak coming from above sensor 10, such as from a water storage device, and/or a puddle that has developed on the floor beneath sensor 10.

As shown in FIG. 7a, when a puddle 52 of a conductive liquid such as water bridges gap 36 between conductive pins 24 and 26 of sensor 10, a low-voltage circuit is completed, which causes a signal 28 to be sent to controller 100. Controller 100 then activates an alarm 130. In one exemplary embodiment, sensor 10 is able to detect the presence of a puddle that is at least 1/32 of an inch deep.

As shown in FIG. 7b, sensor 10 can also detect the presence of a conductive liquid on a top surface of the sensor. When a leak 54 forms above sensor 10, the water or other conductive fluid forms a puddle 56 on the upper concave surface 14 of sensor 10. When puddle 56 bridges gap 36 between conductive pins 24 and 26 of sensor 10, a low-voltage circuit is completed, which causes a signal 28 to be sent to controller 100, which in turn activates alarm 130. Alarm 130 may be an audible alarm, such as a bell, buzzer, or electronic chime to alert a homeowner or other user that a leak has been detected. Alarm 130 may also be a visual alarm, such as a light. Alarm 130 may be activated in an area remote from sensor 10. For example, sensor 10 may be placed in a basement of a house, with controller 100 activating an alarm in the living area of the house to alert a homeowner that a leak has been detected.

Additionally, alarm 130 may be a message sent by electronic or other means. For example, controller 100 may be configured to send an email message, text message, or phone message when a leak or puddle is detected.

Advantageously, sensor 10 can detect leaks coming from above the sensor as well as water accumulating on the floor where the sensor is located. Sensor 10 may be positioned beneath an appliance such as a washing machine, beneath a plumbing fixture or joint, beneath a water tank or water heater, and in any other location where leaks might develop. Additionally, sensor 10 can be placed on a floor or other surface to detect any puddles that may develop. The concave surfaces of upper surface 14 and lower surface 16 causes any liquid falling on the upturned surface to run down toward the center of sensor 10 and collect near gap 36 between conductive pins 24, 26, which allows sensor 10 to detect the presence of even a very small amount of water.

Sensor 10 may be sized to allow the sensor to fit beneath an appliance. In one exemplary embodiment, sensor 10 is approximately three inches in diameter. However, it is contemplated that sensor 10 can be of any suitable size and that the depth of the concave surfaces 14, 16 can be varied depending on the desired characteristics of sensor 10. For example, it may be desirable to increase the diameter of sensor 10 to encompass a larger surface area beneath an appliance.

Figure 8:
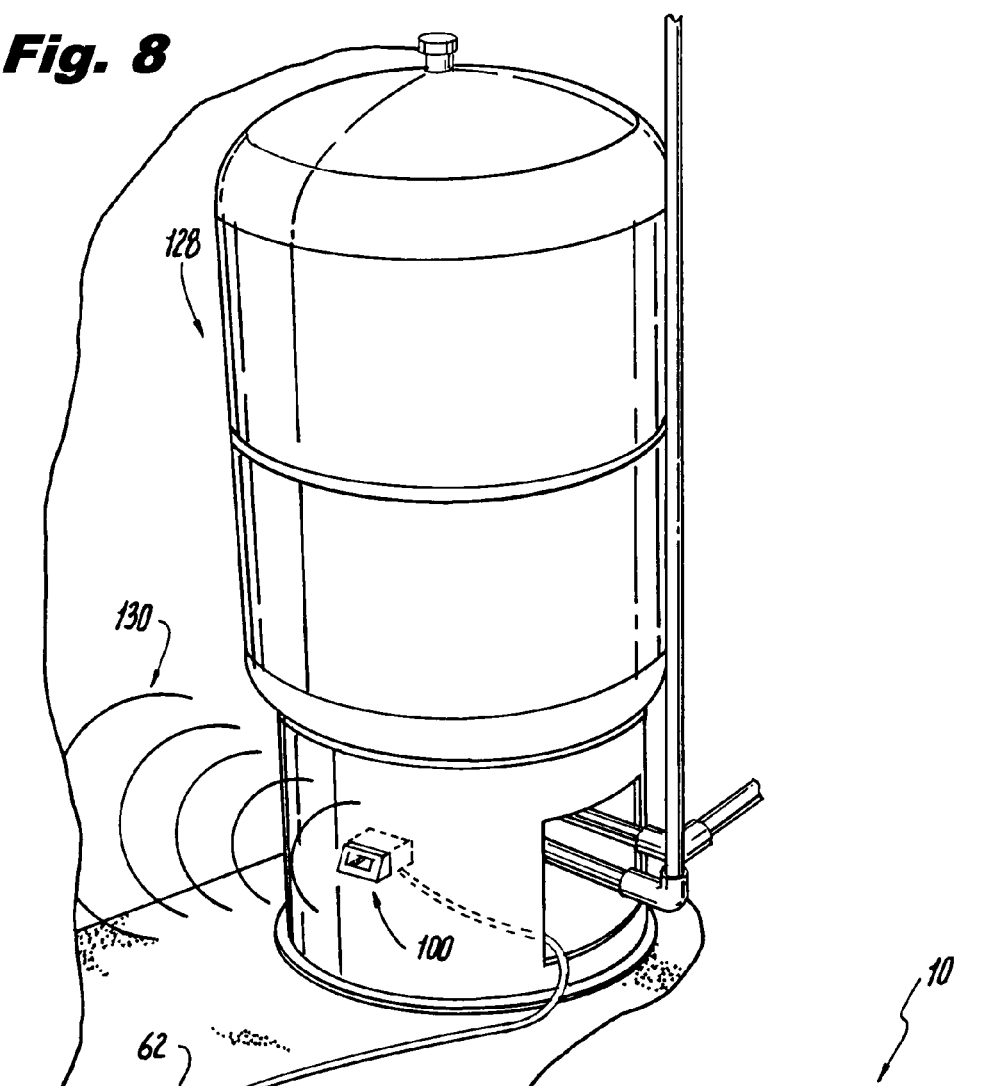
FIG. 8 is a perspective view of an exemplary embodiment of an arrangement of sensors according to the present invention.

Sensor 10 may also form part of a leak detection system 60, as illustrated in FIG. 8. System 60 comprises one or more sensors 10 connected to controller 100. In one exemplary embodiment, controller 100 is a microcontroller including an integrated CPU, memory input and output connectors and other peripherals. As described in previous embodiments, system 60 includes an alarm 130 that is activated when the presence of a conductive liquid is detected. Sensors 10 may be connected to controller 100 by a common wire or cable 62.

Figure 9:
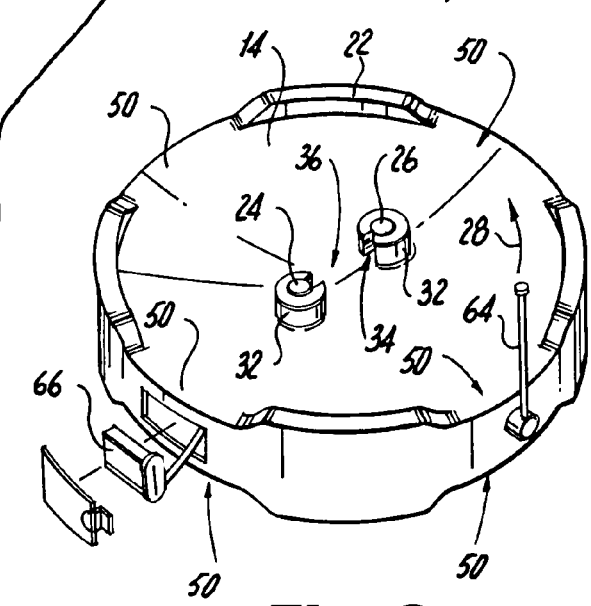
FIG. 9 is a perspective view of an exemplary embodiment of a sensor equipped with a wireless device.

In one exemplary embodiment of system 60, Sensors 10 may be connected to controller 100 wirelessly, as shown in FIG. 9. Sensor 10 shown in FIG. 9 includes a wireless transmitter/receiver 64 and a portable power source 66. Wireless sensor 10 can then be positioned throughout a space to detect the presence of water or another liquid without the use of cords or wires. System 10 may include any combination of wired and wireless sensors 10 in any desired number and configuration. For example, to alert a homeowner of flooding in a typical basement, sensors 10 could be placed under a washing machine, under a hot water heater, a water tank, and any other area susceptible to leaks or flooding.

In operation, sensors 10 are distributed throughout a space that is to be monitored. When any one of the conductive members 24, 26 of sensors 10 come into contact with the a puddle of water or other conductive liquid, output signal 28 is generated and sent through output connector 30 or through the air to controller 100. Output signal 28 causes controller 100 to change state, which in turn activates alarm 130. Alarm 130 alerts a homeowner or other user that a puddle of water has been detected.

The devices and systems of the present invention, as described above and shown in the drawings, provide for a leak detection sensor that is portable, relatively inexpensive, reliable and easy to use. Additionally, the leak detection sensor of the present invention is able to detect the presence of a conductive liquid both above and below the sensor. It will be apparent to those skilled in the art that various modifications and variations can be made in the devices and systems of the present invention without departing from the scope of the invention as set forth in the appended claims and their equivalents.

The invention claimed is:

1. A sensor for detecting the presence of a liquid, comprising:
   a) a housing having a concave upper surface, a concave lower surface, a peripheral wall connecting the upper surface and the lower surface, the wall extending above the upper surface and below the lower surface and having a plurality of apertures formed therein;
   b) a plurality of electrically conductive members extending above the upper surface and below the lower surface and separated from one another by a gap in which a liquid can accumulate, the electrically conductive members being configured to generate an output signal when a conductive liquid comes into contact with the electrically conductive members and bridges the gap; and c) an output connector coupled to the plurality of electrically conductive members and being configured to carry the output signal.

2. The sensor of claim 1, wherein the concave upper surface has a first perimeter defining a first plane, and the concave lower surface has a second perimeter defining a second plane, the first plane and the second plane being substantially parallel to one another, the housing being substantially symmetrical about a third plane equidistant from the first plane and the second plane.

3. The sensor of claim 1, wherein the housing is substantially cylindrical in shape.

4. The sensor of claim 3, wherein the apertures are spaced around a circumference of the upper surface and a circumference of the lower surface in a radially symmetric manner.

5. The sensor of claim 1, wherein a plurality of supports are positioned around the perimeter of the upper concave surface and the perimeter of the lower concave surface.

6. The sensor of claim 1, wherein the plurality of conductive members comprise a first pin and a second pin.

7. The sensor of claim 6, further comprising protectors surrounding each of the first and second pins.

8. The sensor of claim 7, wherein the protectors are substantially cylindrical with a cut-out portion allowing for access to the first and second pins, wherein the first and second cut-out portions face each other.

9. The sensor of claim 1, wherein the housing comprises an internal shell substantially covered by an overmolded material.

10. The sensor of claim 9, wherein the internal shell comprises a lower portion and an upper portion.

11. A sensor for detecting the presence of a liquid, comprising:
   a) a housing having a concave upper surface and a concave lower surface surrounded by a cylindrical wall, the upper surface, lower surface, and cylindrical wall forming a hollow portion within the housing, wherein the cylindrical wall includes a plurality of apertures;
   b) a first conductive pin and a second conductive pin, the first and second conductive pins extending through the hollow portion of the housing and protruding above the concave upper surface and below the concave lower surface, the first and second conductive pins being separated from one another by a gap in which a liquid can accumulate, the first and second conductive pins being configured to generate an output signal when a conductive liquid comes into contact with both the first and the second conductive pins and bridges the gap; and
   c) an output connector, coupled to the first and second conductive pins and configured to carry the output signal.

12. The sensor of claim 11, wherein the apertures are spaced in a radially symmetric manner around the perimeter of the cylindrical wall.

13. The sensor of claim 11, wherein the output connector is positioned outside of the housing and is coupled to the first and second conductive pins by wires extending through an aperture in the cylindrical wall.

14. The sensor of claim 11, wherein the first and second conductive pins are positioned equidistant from a line passing through the deepest point of the concave upper surface and the deepest point of the concave lower surface.

15. The sensor of claim 11, further comprising protectors surrounding each of the first and second pins.

16. The sensor of claim 15, wherein the protectors are substantially cylindrical with a cut-out portion allowing for access to the first and second pins, wherein the first and second cut-out portions face each other.

17. A system for detecting the presence of a liquid, comprising:
   a) A sensor having a housing with a concave upper surface, a concave lower surface, a peripheral wall connecting the upper surface and the lower surface, the wall extending above the upper surface and below the lower surface and having a plurality of apertures formed therein;
   b) a plurality of electrically conductive members extending above the upper surface and below the lower surface and separated from one another by a gap in which a liquid can accumulate, the electrically conductive members being configured to generate an output signal when a conductive liquid comes into contact with the electrically conductive members and bridges the gap;
   c) an output connector coupled to the plurality of electrically conductive members and being configured to carry the output signal;
   d) a control system interfacing with the output connector and receiving the output signal; and
   e) an alarm activated by the control system in response to the output signal.

18. The system of claim 17, wherein the sensor includes a plurality of sensors connected to a common power source.

19. The system of claim 17, wherein the alarm is at least one of an audible alarm, a visual alarm, an email message, a phone message, and a text message.

20. The system of claim 17, wherein the output connector comprises a wireless transmitter.

* * * * *

UNITED STATES PATENT AND TRADEMARK OFFICE
CERTIFICATE OF CORRECTION

PATENT NO. : 7,671,754 B2 Page 1 of 1
APPLICATION NO. : 11/948493
DATED : March 2, 2010
INVENTOR(S) : Albert R. Heilmann et al.

It is certified that error appears in the above-identified patent and that said Letters Patent is hereby corrected as shown below:

Title page, item [74] Firm Name is as follows:

Edwards Angell Palmer & Dodge LLP

Signed and Sealed this

Twenty-seventh Day of April, 2010

David J. Kappos
*Director of the United States Patent and Trademark Office*